May 26, 1964  R. A. OLSEN ETAL  3,134,340
BALANCER ASSEMBLY
Filed Sept. 17, 1962  5 Sheets-Sheet 1
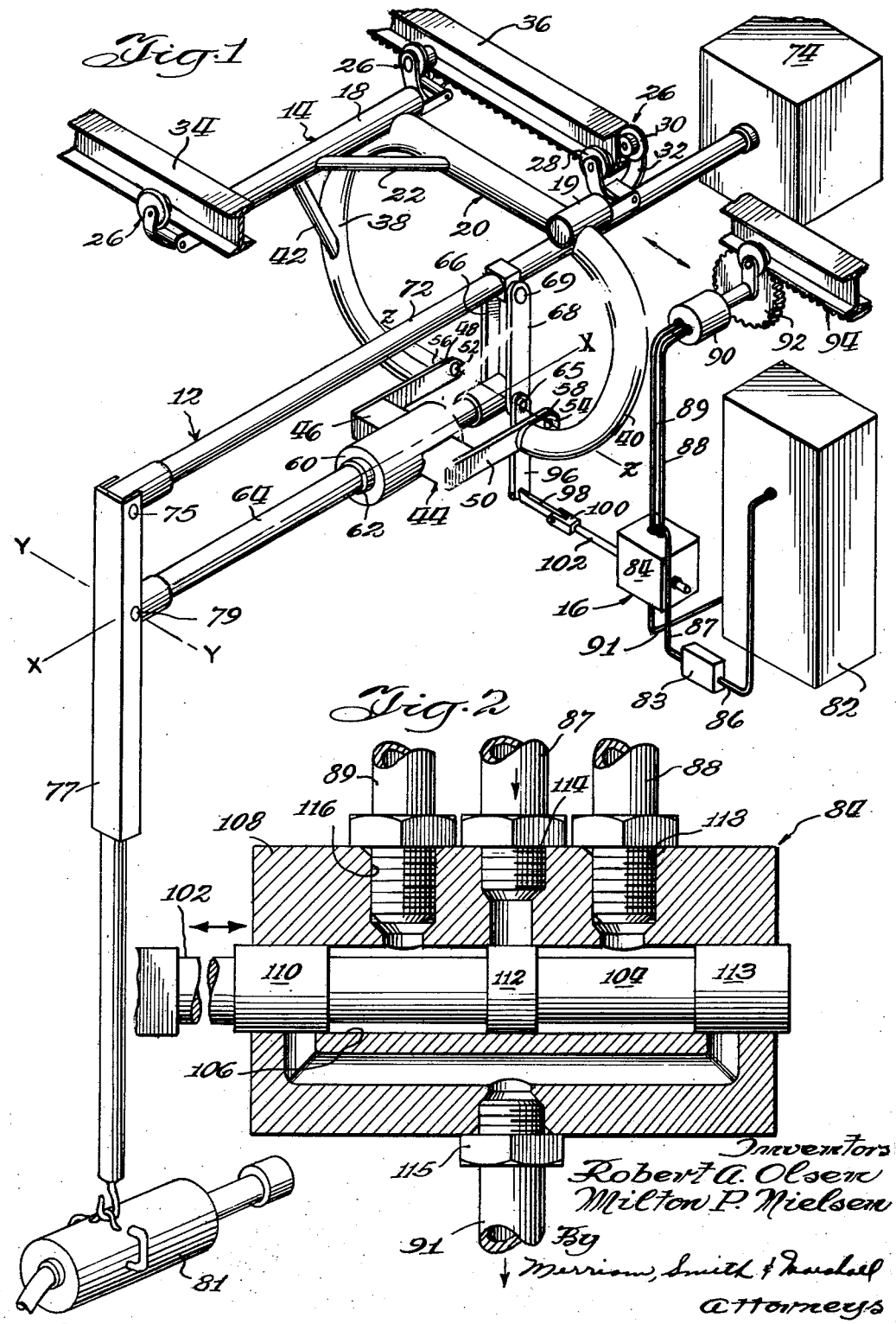
Inventors
Robert A. Olsen
Milton P. Nielsen
By
Morrison, Smith & Marshall
Attorneys

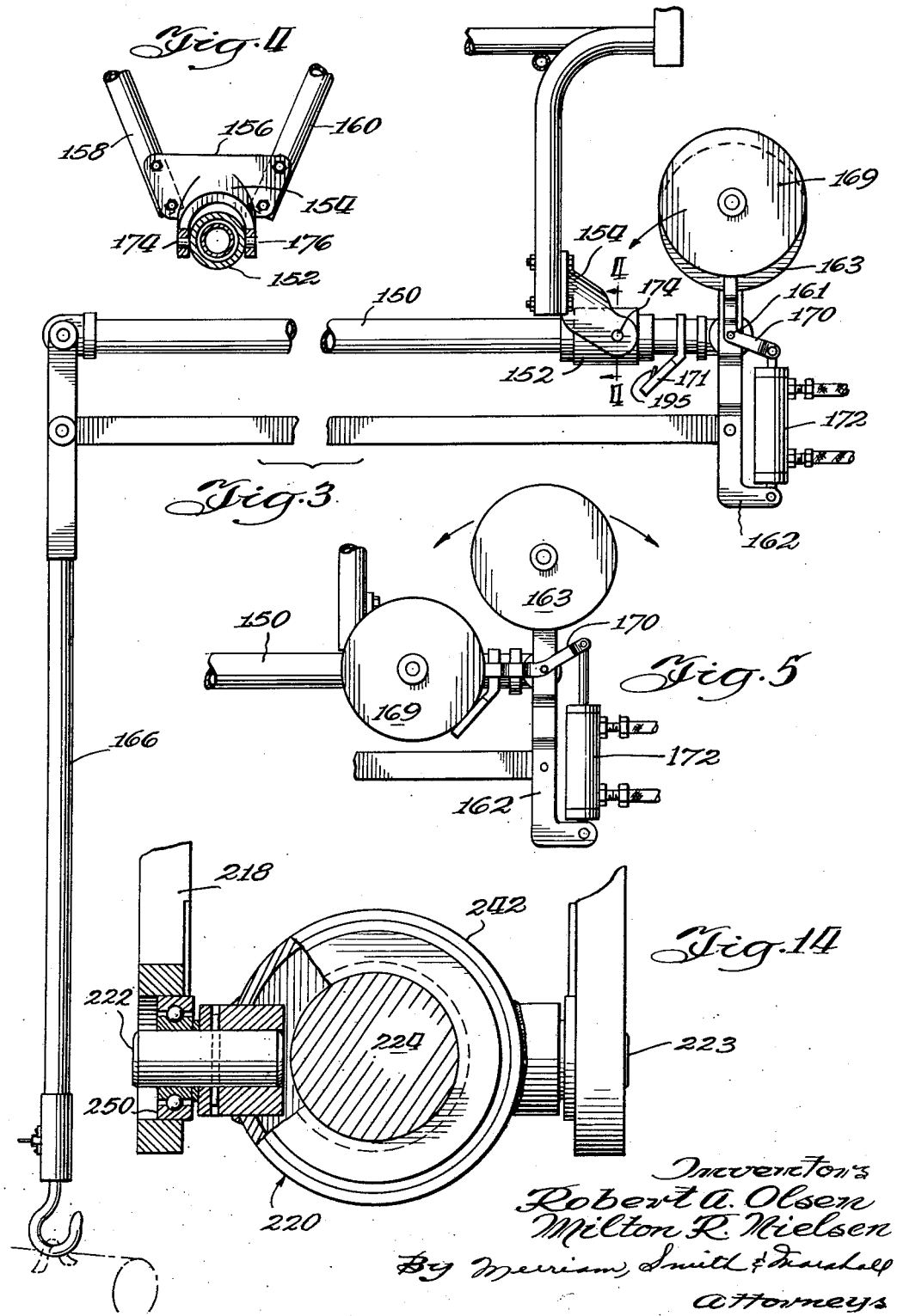

May 26, 1964
R. A. OLSEN ETAL
3,134,340
BALANCER ASSEMBLY
Filed Sept. 17, 1962
5 Sheets-Sheet 3
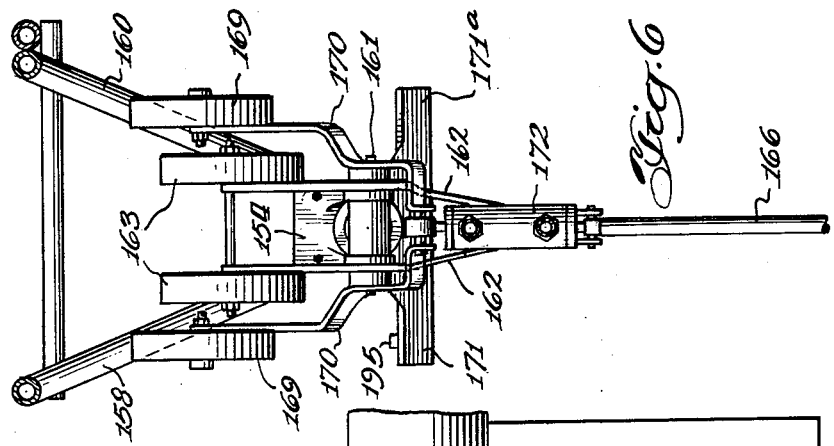
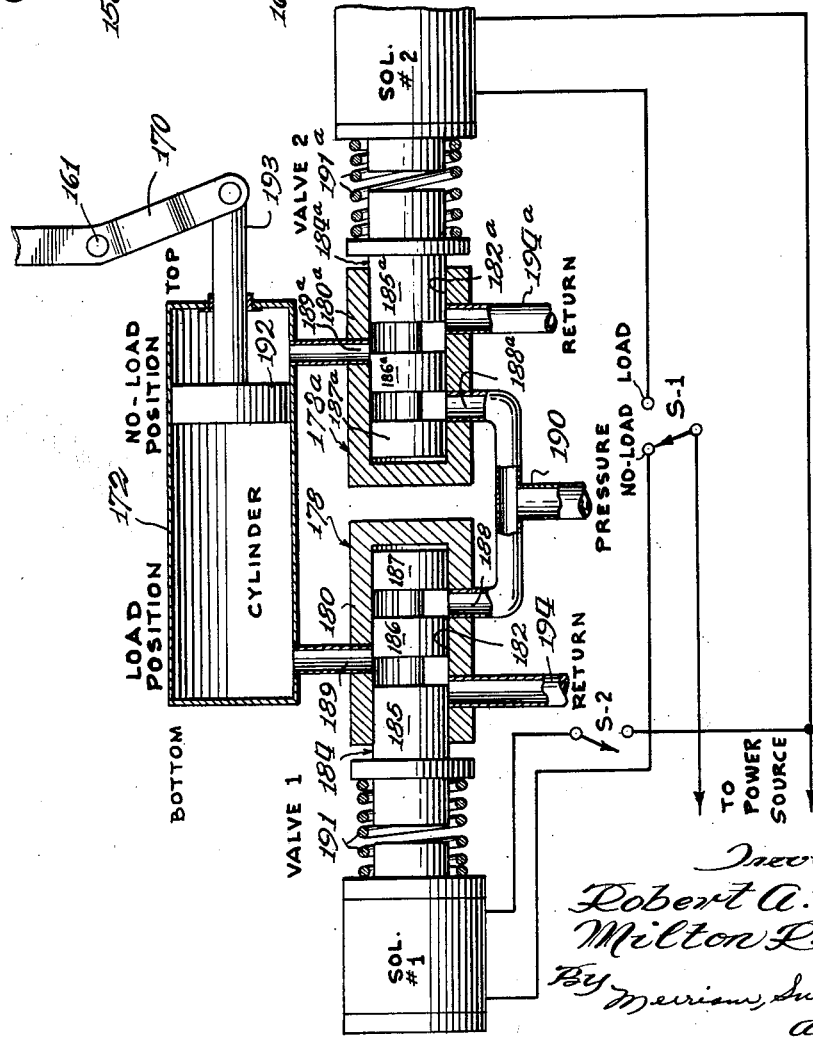
Inventors
Robert A. Olsen
Milton R. Nielsen
By Merriam, Smith & Marshall
attorneys May 26, 1964     R. A. OLSEN ETAL     3,134,340
BALANCER ASSEMBLY
Filed Sept. 17, 1962     5 Sheets-Sheet 4
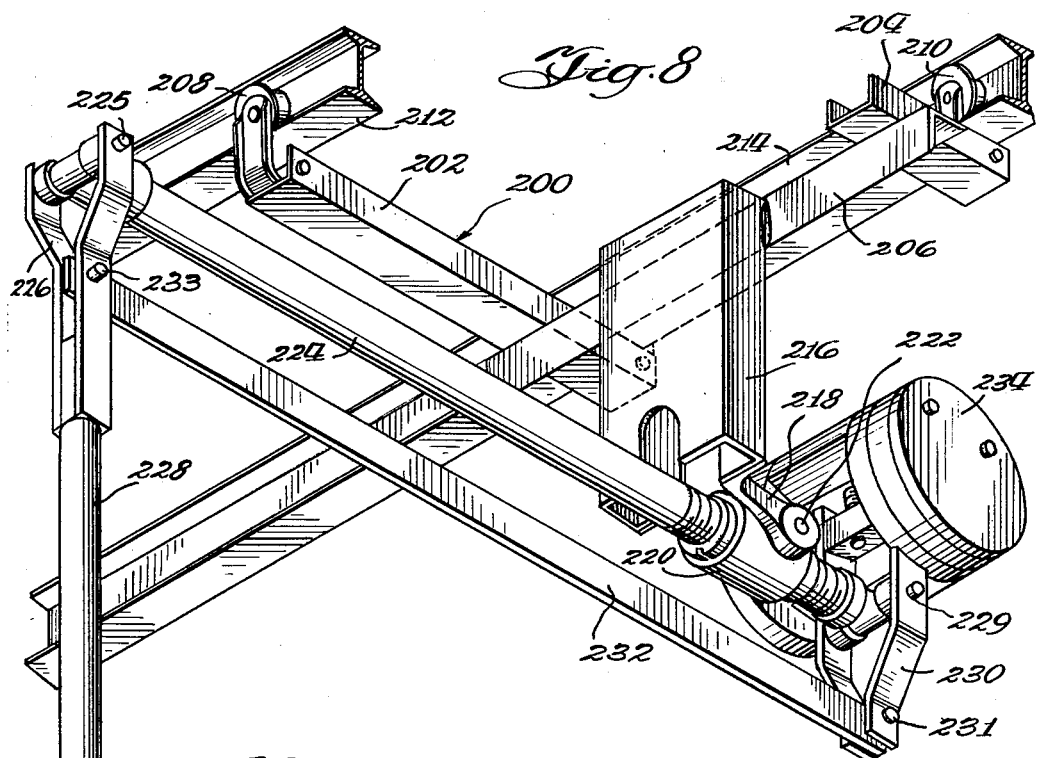
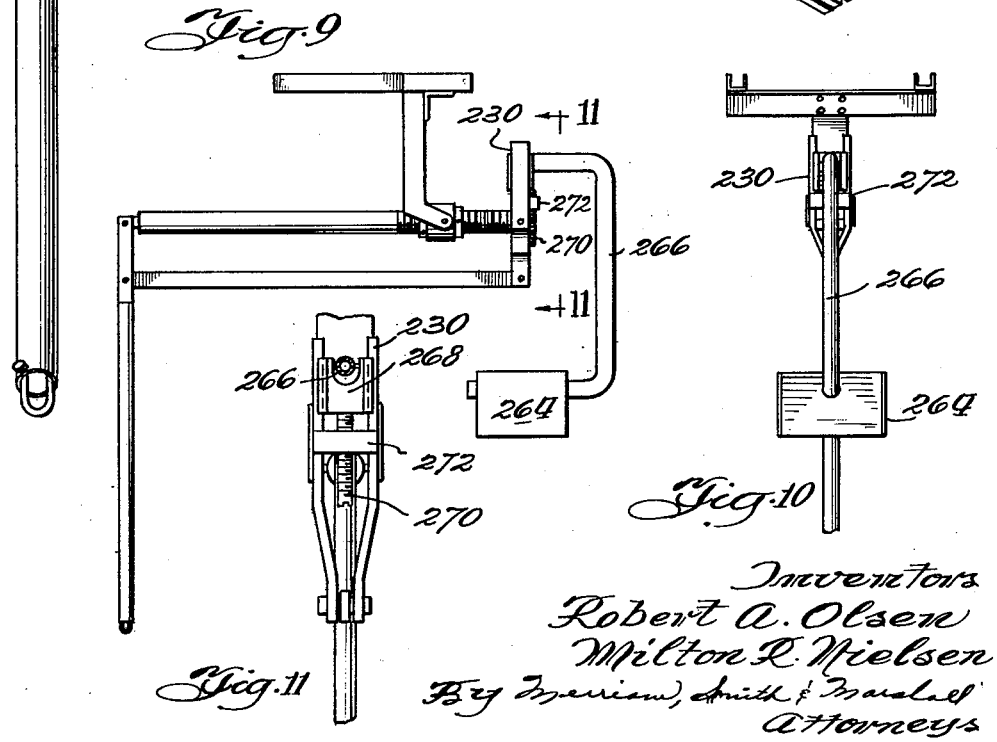
Inventors
Robert A. Olsen
Milton R. Nielsen
By Merriam, Smith & Marshall
Attorneys Inventors
Robert A. Olsen
Milton R. Nielsen
By Merriam, Smith & Marshall
attorneys United States Patent Office 3,134,340
Patented May 26, 1964

3,134,340
BALANCER ASSEMBLY
Robert A. Olsen, Palatine, and Milton R. Nielsen, Glen Ellyn, Ill., assignors to Entech Corporation, a corporation of Delaware
Filed Sept. 17, 1962, Ser. No. 224,157
5 Claims. (Cl. 104—89)

This invention relates to load handling equipment and more particularly to a positioning, balancing and hoisting apparatus for work pieces, power tools, and the like.

In many manufacturing operations wherein essentially the same load is repeatedly lifted and positioned, as in assembly lines, it is particularly desirable, if the work piece has sufficient weight or bulk to cause undue worker fatigue to employ a balancing apparatus to supply the requisite lifting force, while permitting manipulation of the load into exact placement with no substantial effort. Similarly, in the operation tof heavy power tools, welding equipment and the like, it is desirable to counterbalance the weight of the tool or equipment, while permitting exact positioning of the tool as desired.

This invention is directed to a positioning apparatus which permits exact balancing of a load about three axes and provides means whereby the work piece can be moved as desired in any direction to any position within the effective coverage of the apparatus with only a slight effort, which remains constant regardless of the direction in which the load is moved. In one of its embodiments the invention contemplates the use of the basic balancing apparatus in conjunction with a carriage mounted on an overhead rail and provided with a powered traverse system which is automatically activated when a predetermined extreme position of the balancing apparatus is reached.

Because of the fact that within the effective range of the equipment there is no change in the force required to operate the basic balancing apparatus, the traverse system need not be as complicated as would be required when the necessary operating force is proportional to the displacement from a rest position, such as is commonly encountered with spring balanced systems. With the latter systems it, is, of course, desirable or necessary that the traverse power system position the apparatus with its rest position as closely as possible to the desired location in order to avoid the necessity for overcoming the force exerted by the spring tension or pendulous lifting of the load. With the apparatus of the invention, the positioning of the carriage can be approximated, provided only that the point to which the load is to be positioned is within the coverage of the apparatus, and no exact positioning of a rest point is necessary.

The invention will be more fully understood from the following detailed description thereof, taken in conjunction with the accompanying drawings, in which the same numbers are used to indicate like elements in the several views, and in which:

FIGURE 1 is a diagrammatic and perspective view, partly broken away for the sake of clarity, of positioning apparatus made in accordance with the present invention;

FIGURE 2 is a greatly enlarged sectional view of a hydraulic control valve forming a part of the system of FIGURE 1;

FIGURE 3 is an elevational view of a positioning apparatus made in accordance with a modified form of the present invention which permits hoisting a load, showing the load counterweight in the load carrying position;

FIGURE 4 is a sectional view taken along line 4—4 of FIGURE 3;

FIGURE 5 is a fragmentary elevational view of a portion of the positioning apparatus of FIGURE 3, showing the load counterweight in the no-load position;

FIGURE 6 is a fragmentary side detail of the embodiment of FIGURE 3;

FIGURE 7 is a partially schematic view of a control system used in conjunction with the embodiment of FIGURE 3;

FIGURE 8 is a perspective view of another embodiment of the invention;

FIGURE 9 is a simplified elevational view of the embodiment of FIGURE 8 which has been modified to use an underslung counterweight;

FIGURE 10 is a side view of the apparatus of FIGURE 9;

FIGURE 11 is a partial sectional view along the line 11—11 of FIGURE 9;

FIGURE 14 is an enlarged sectional view along the line 14—14 of FIGURE 12, including also a fragmentary section of the pivot bearing showing a trunnion.

Figure 12:
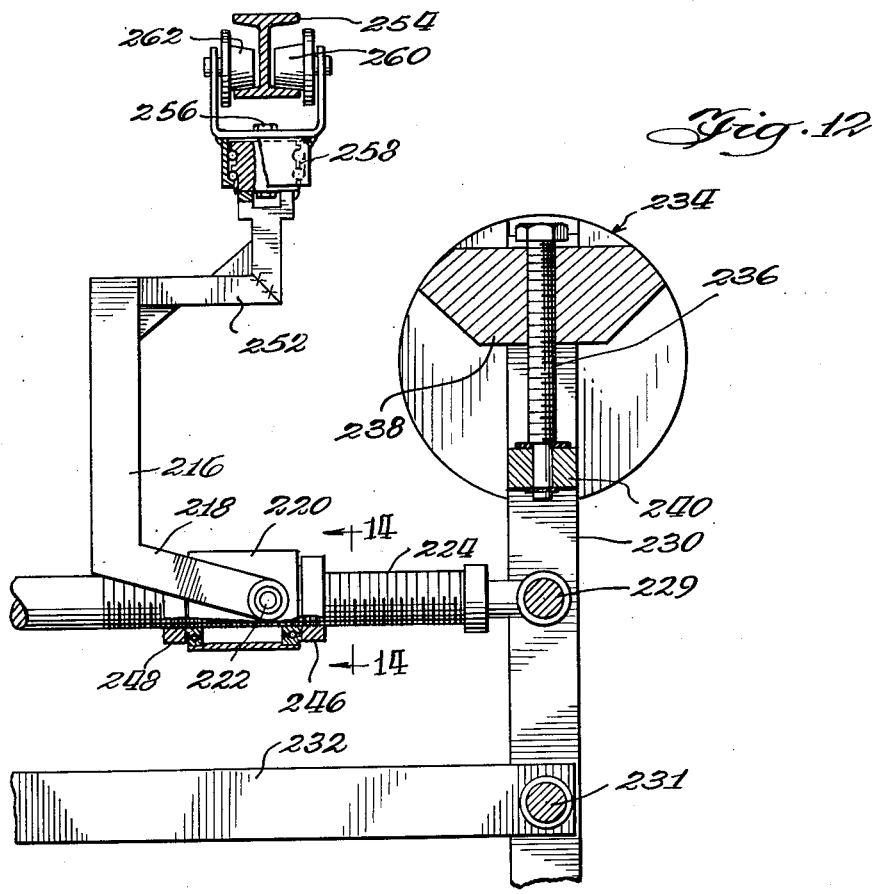
FIGURE 12 is a fragmentary elevational view in partial section of an embodiment similar to that of FIGURE 8 which has been modified for use with a monorail overhead support and which permits rotation of the balancing apparatus about the point of support.

Referring to the drawings and more particularly to FIGURE 1, the positioning apparatus of the present invention includes a triaxial balancer assembly 12, a carriage 14 and a power mechanism 16. It will be appreciated that the carriage 14, and the assembly 12, may be moved manually in a horizontal direction, if desired.

The carriage 14 is illustrated as comprising a rod 18 and a stub rod 19 supporting a hanger 20 having arcuate side pieces 38 and 40. Strengthening of the structure is afforded by means of struts 22 and 42. Connected to the ends of rod 18 and to stub rod 19 are roller assemblies 26, each of which has a pair of spaced, opposed rollers 28 and 30 mounted for rotation in a cradle 32. The rollers 28 and 30 rotate upon the upper surface of the base arms of I-shaped tram rails 34 and 36. To the side pieces 38 and 40 of hanger 20 is secured the balancer assembly 12 which will now be described.

The balancer assembly 12 includes a yoke 44 having base member 46 and spaced parallel arms 48 and 50, the outer ends of which are pivotally connected at 52 and 54 to flanges 56 and 58 which are affixed to the free ends of the side pieces 38 and 40, respectively. The base member 46 has positioned therein a cylindrical pivot bearing 60, having a central bore 62 therein for slidable and rotatable reception of a first arm 64. One end of the arm 64 lies between the yoke arms 48 and 50 and has pivotally secured thereto at 65, one end of a pair of links 66 and 68 which together may be considered as constituting an arm. The other ends of the links 66 and 68 are pivotally secured at 69 to arm 72, to one end of which is secured counterweight 74, while the opposite end is pivotally connected at 75 to one end of a load-supporting arm 77. The other end of the arm 64 is pivotally connected, by means of pivot pin 79, to the arm 77 at a point spaced from the pivot point 75. At the lower end of arm 77 is shown a representative load, i.e., a power wrench 81.

The lengths of arm 64 (between pins 79 and 65) is equal to that of arm 72 (between pins 75 and 69), while the length of links 66 and 68 (between pins 69 and 65) is equal to that of arm 77 (between pins 79 and 75), so that a parallelogram is formed, with arm 64 being parallel to arm 72 and arm 77 being parallel to links 66 and 68. The moment arms and the size of counterweight 74 are chosen (or adjusted) such that with arm 77 and links 66 and 68 in a vertical position, load 81 is balanced in the manner of a beam balance. The described relationship among arms 64, 72, and 77 and links 66 and 68 has the result that rotation of arm 77 about axis Y—Y passing through pin 79, which effectively increases or decreases the moment arm of the load 81, at the same time has a compensating effect on the moment arm of counterweight 74, increasing and decreasing it correspondingly and proportionately so that the system once balanced, continuously remains in a beam balanced condition.

When viewed from the front (i.e., along the X—X axis in FIGURE 1) it will be seen that the apparatus will remain in balance about axis X—X provided the lever arm (i.e., the effective length of links 66 and 68) and the size of counterweight 74 are selected to counterbalance the corresponding lever arm (from pin 79 to the center of gravity of the work piece) and the weight of the load 81. By suitable selection and adjustment of the variable qualities, a completely balanced condition of the work piece about axes X—X, Y—Y and Z—Z is achieved. In this condition a constant small force representing only the frictional forces encountered in the bearings of the apparatus is required to move the load in any direction as desired.

As examples, with suitably selected bearings, the force necessary to position a 40 lb. load is on the order of only 8 ozs., while that for a 100 lb. load is approximately 20 ozs. Since the load is completely balanced at all times, it can be positioned as desired and released and will have no tendency to move from its position. The advantages flowing from the use of such a balancing apparatus in various assembly operations will be obvious to those skilled in the art.

In FIGURE 8 there is depicted another embodiment of the balancer of the invention which, although somewhat different in construction, embodies the same principles of operation as that of the embodiment of FIGURE 1 already described. As seen in FIGURE 8, the apparatus comprises an overhead carriage 200 formed of channels 202 and 204 and angle 206 to which are affixed rollers 208 and 210 supported by a pair of overhead tram rails 212 and 214. Affixed to angle 206, as by welding, is box girder or rectangular tubing 216 which is provided at its bottom end with yoke 218 between the arms of which is supported pivot bearing assembly 220 by means of trunnions 222. Slidably received in and supported by pivot bearing assembly 220 is arm 224 having one end pivotally connected at 225 to yoke 226 which in turn forms a part of the load bearing arm 228. At its other end, arm 224 is pivotally connected at 229 to yoke 230 which corresponds to links 66 and 68 in the embodiment of FIGURE 1. The lower end of yoke 230 is pivotally connected at 231 to arm 232 which, at its other end, is also pivotally connected at 233 to load arm 228. On an extension of yoke 230 is attached counterweight 234 corresponding to weight 74 in FIGURE 1. It will be noted that arm 224 (between pivot pins 225 and 229), arm 232 (between pivot pins 233 and 231), yoke 226 (between pivot pins 225 and 233), and yoke 230 (between pivot pins 229 and 231) form a parallelogram as in the embodiment previously described.

Figure 13:
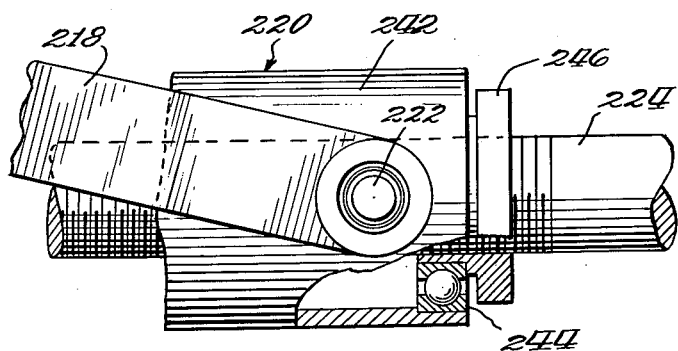
FIGURE 13 is a detail of the pivot bearing used to permit rotation of a horizontal arm in the apparatus of FIGURE 12.

Whereas the embodiment of FIGURE 1 is more advantageously used with a constant fixed load for which it is designed, the embodiment of FIGURE 8 is more readily adjusted to a variety of fixed loads by means of the operating adjustments shown in FIGURES 12 and 13. Adjustment of the apparatus to balance any fixed load is done coarsely by changing the amount of counterweight 234. Finer adjustment is made by adjusting pivot bearing assembly 220 along the length of arm 224 to change the relative lever arms and by changing the distance of the counterweight above pin 229. As will be seen, counterweight 234 is held in place by means of jackscrew 236 held in vertical position in plate 240 between the arms of yoke 230 which threadedly engages web 238 of the weight 234. By suitable rotation of jackscrew 236 the effective height of the counterweight above the pivot bearing assembly 220 can be adjusted as required with a given load.

Adjustment of the relative moment arms along the length of arm 224 held in pivot bearing assembly 220 is permitted by the construction of the pivot bearing assembly 220 shown in FIGURE 13. It will be seen that the pivot bearing comprises a cylinder 242 equipped with ball bearings, e.g., 244, at each end. The arm 224 is equipped with threads on which turn collars 246 and 248. Having adjusted the desired position of arm 224 in pivot bearing 220, the collars are turned firmly into contact with the inner races of the bearings, thus permitting free rotation of the arm 224 but preventing longitudinal displacement of the arm within the pivot bearing.

FIGURE 14 illustrates the construction of the pivot bearing 220 which permits it to pivot about a generally horizontal axis. As shown, the pivot bearing is equipped with trunnions 222 and 223 which are supported by ball bearings, e.g., 250, held within the arms of yoke 218. This construction of the apparatus permits both free rotation of arm 224 about its longitudinal axis and pivotal movement about an axis perpendicular thereto passing through trunnions 222 and 223.

It will be seen that in its balanced condition the center of gravity of the balancer apparatus, including the load and counterweight, lies at the intersection of the longitudinal axes of arm 224 and trunnions 222 and 223. By positioning this center of gravity directly below an overhead support by means of rigid bracket 252 (FIGURE 12) it is possible to employ a monorail rather than a pair of rails for supporting the balancer assembly and permitting movement thereof to a desired location.

A further modification which may be desirable in some instances is the provision of a king pin 256 and bearing 258 between the bracket 252 and the rollers 260 and 262 which roll on monorail 254. The king pin assembly permits rotation of the balancer apparatus about a vertical axis. This configuration may be desirable because the extension of load arm of the balancer assembly can in some instances be greater in one direction than in another. Thus, by permitting rotation of the entire assembly, it will always be possible to position it so as to achieve the greatest extension of the load arm in any desired direction.

A further modification of the embodiment of FIGURE 8 is shown in FIGURES 9, 10 and 11. This embodiment features an underslung counterweight 264, typically representing the transformer of welding equipment or the like, which can suitably be used as a counterweight. The weight is designed to hang pendulously beneath its point of attachment to yok 230 by means of U-shaped hanger 266. As seen in FIGURE 11, the upper end of hanger 266 is pivotally connected to plate 268, provided with side channels engaging the arms of yoke 230. Plate 268 can be raised and lowered by means of jackscrew 270 which is threaded through the plate 272.

As previously mentioned, a desirable modification of the invention provides for powered traverse of the carriage supporting the balancer assembly along a monorail or pair of tram rails. A suitable hydraulic apparatus for performing this function is shown in FIGURES 1 and 2. It will be apparent to those skilled in the art that an electrical drive and control system or a pneumatic system could also be used. The power mechanism 16, includes a reservoir 82, a pump 83 driven by any suitable means (not shown), a control valve 84 (shown in detail in FIGURE 2), a conduit 86 connecting reservoir 82 and pump 83, a conduit 87 leading from pump 83 to control valve 84, conduits 88 and 89 connecting the control valve 84 to hydraulic motor 90 for driving gear 92 in mesh with rack 94 secured to the lower surface of rail 36, and a conduit 91 for exhausting back to reservoir 82.

In the apparatus shown in FIGURE 1, the control valve is actuated on movement of the balancing assembly 12 beyond predetermined limiting positions, in one direction or the other, about the axis X—X. The amount of such movement which is permitted before the valve is actuated is, of course, a matter of choice and depends on the particular application in which the apparatus is used.

In order to actuate the valve 84, one end of link 96 is pivotally connected at 65 to the arm 64. The other end of link 96 is connected, by means of bar 98 and yoke 100, to a control rod 102 which in turn is connected to valve plunger 104 of valve 84, which is illustrated in neutral position in FIGURE 2. Plunger 104 is slidably received in a bore 106 in valve body 108 and is formed with axially spaced lands 110, 112 and 113. The valve body 108 is also formed with inlet port 114 in communication with the conduit 87, outlet ports 116 and 118 communicating with conduits 89 and 88, respectively, and an outlet port 115 communicating with conduit 91 for passage of the fluid back to reservoir 82.

When the load 81 is moved about the axis X—X in a clockwise direction the plunger 104 is moved to the left as viewed in FIGURE 2 to afford fluid communication between the inlet port 114 and the outlet port 118 for actuation of the motor 90 and rotation of the gear 92 in a clockwise direction for advancement of the carriage and power mechanism in the direction of movement of the load. Similarly, initial movement of the load in a counterclockwise direction about the axis X—X effects movement of the plunger 104 to the right to afford communication between inlet port 114 and outlet port 116 to actuate the motor 90 in the opposite direction and rotate the gear 92 counterclockwise for movement of the entire carriage and power mechanism in the opposite direction.

The powered traverse mechanism is constructed with valves 84 and motor 90 supported on carriage 14 by suitable means (not illustrated). Pump 83 and reservoir 82 can be either mounted on the carriage or located at a distance in some convenient stationary position. A rigid conduit for the hydraulic fluid can be used if the pump and motor travel with the carriage, while flexible hoses are needed if the pumps and reservoir are stationary. It should also be noted that other systems equivalent to the hydraulic apparatus described can also be used, including pneumatic or electrical drives which will be obvious to those skilled in the art.

A particular advantage of the instant invention in connection with the powered traverse mechanism stems from the fact that the balancer apparatus is always in precise balance with the load. Accordingly, it is possible to use a relatively simple traverse mechanism, for example, one capable of advancing only in discrete steps or distances rather than continuously controllable in its motion. The objective is only to position the carriage at a point where the normal operating range of the balancer apparatus will permit accomplishment of the desired task, rather than precisely to position the carriage at a point where the balancer in its rest position is in the desired location. Thus, for example, a suitable electrical drive system might provide a simple on-off control of a motor to move the carriage a fixed distance every time it is energized. Variable control of distance would not be required with such a setup, thus permitting obvious savings in first costs and upkeep.

FIGURES 3, 4, 5, and 6 illustrate still another modification of the invention whch in its general configuration is similar to that of FIGURE 8. This embodiment is constructed to permit two operating modes of the apparatus—one in which no load is used and in which the apparatus is balanced for its own weight only, and one in which the apparatus is balanced to support a given predetermined load. Thus, in the unloaded position, the balancer apparatus is readily manipulated to engage a load which is at rest. With the load engaged, the apparatus is actuated to assume its loaded operating mode, as a result of which the load is effectively hoisted (although it does not move) and thereafter may be readily positioned as desired because of its perfectly balanced condition.

The apparatus of FIGURE 3 is closely analogous to that of FIGURE 8. It comprises a gimbal 154 having an integrally formed upstanding bracket 156 to which are secured supports 158 and 160 for suspending the assembly from a suitable carriage as in the embodiment of FIGURE 1. Arm 150 is supported by pivot bearing 152 and is pivotally connected at one end to pin 161. Also mounted for pivotal movement about pin 161 are a pair of L-shaped brackets 162 at the upper ends of which are mounted counterweights 163 used to balance the weight of the apparatus alone, i.e., less the load.

In accordance with the invention, the apparatus includes a pair of load counterweights 169 so arranged that they are movable between positions corresponding to the different modes of operation of the apparatus. To this end, counterweights 169 are mounted on the outer ends of arms 170, of bellcrank configuration, which are in turn mounted for pivotal movement about pin 161.

In FIGURE 5, the mechanism is illustrated in the "no-load" position, in which weights 169 are supported by rests 171 and 171a which hold the counterweights with their centers of gravity on the axis of trunnions 174 and 176 in pivot bearing 152. In this position the counterweights have zero moment arm and accordingly have no effect on the overall balance of the apparatus. In the "load" mode of operation, the counterweights 169 are moved to the position illustrated in FIGURE 3 by suitable actuating means which can be pneumatically, electrically or hydraulically powered, as desired.

FIGURE 7 illustrates a suitable hydraulic control system which can be used to move counterweights 169 between the load and no-load positions. The control system includes a pair of identical valves 178 and 178a having valve bodies 180 and 180a, provided with elongated bores 182 and 182a within which are slidably received plungers 184 and 184a having spaced lands 185, 186, and 187 and 185a, 186a, and 187a. Each valve contains an inlet pressure port 188 communicating with bore 182, an outlet pressure port 189 connected to an end of hydraulic cylinder 172 used to actuate bell-crank 170. Manifold 190 provides hydraulic fluid from a suitable pressure source (not shown) to each valve. Each plunger 184 is activated by a solenoid (Nos. 1 and 2) and in each case the plunger is biased away from the solenoid by means of a spring 191.

The operation of the control system is as follows. When operating switch S–1 is turned to the "load" position, solenoid No. 2 is energized, causing plunger 184a to be retracted to the right, to a position in which free communication is provided via the groove between lands 187a and 186a between pressure manifold 190 and the right side of piston 192 in cylinder 172. The fluid under pressure accordingly fills the cylinder 172, moving the piston 192 to the left and causing connecting rod 193 to rotate bell-crank 170 to a condition such that the weight attached thereto is in the load position shown in FIGURE 3. In this condition the apparatus is fully the equivalent of the embodiment shown in FIGURE 8 and provides a balanced condition for the load.

When it is desired to unload the apparatus, switch S–1 is thrown to the "no-load" position, activating solenoid No. 1 and deactivating solenoid No. 2. When solenoid No. 2 is deactivated plunger 184a, urged by spring 191a, returns to the position shown in which free communication is provided between the right side of cylinder 172 and the return conduit 194a leading to sump. At the same time solenoid No. 1 causes plunger 184 to retract to a position in which the fluid under pressure is provided to the left side of cylinder 172, thus driving piston 192 to the right and causing counterweights 169 to assume the condition shown in FIGURE 5.

As the counterweights 169 near the end of their travel to the "no-load" position shown in FIGURE 5, normally closed limit switch S-2 shown as item 195 in FIGURES 3 and 6, is opened, deenergizing solenoid No. 1 and allowing the plunger to assume the position shown in FIGURE 7 in which both sides of cylinder 172 are in direct communication with sump through lines 194 and 194a.

In the condition of the control system shown in FIGURE 7 corresponding to the no-load position of counterweights 169, it will be seen that both sides of cylinder 172 are in communication with the sump, so that piston 192 will move freely in the cylinder without applying any force to the counterweights 169. Accordingly, the counterweights 169 will remain supported by rests 171 and 171a, regardless of any movement of the baalncer assembly which might cause the position of the piston 192 in cylinder 172 to vary.

Although in the description herein certain elements have been described as generally horizontal or generally vertical, it should be understood that this description applies only to the most usual position of these elements. Actually, since the balancer assembly is in fact balanced in all positions, it can be used in any position, including what would normally be considered upside-down. Accordingly, no limitation is intended by the terminology which has been used.

The foregoing detailed description has been given for clearness of understanding only, and no unnecessary limitations should be understood therefrom, as modifications will be obvious to those skilled in the art.

What is claimed is:

1. A balancer and positioning apparatus comprising at least one generally horizontal tram rail, a carriage suspended from and adapted to roll on said tram rail, a balancer assembly affixed to said carriage for movement therewith, said balancer assembly comprising a pivot bearing mounted for pivotal movement about a horizontal axis, a generally horizontal first arm mounted for rotation about its longitudinal axis in said bearing, a generally vertical second arm adapted to receive a load to be balanced and positioned by said apparatus, said second arm being pivotally connected to said first arm, a generally horizontal third arm pivotally connected to said second arm, a generally vertical fourth arm pivotally connected to said second arm and to said first arm, the spacing between said pivotal connections being such that said arms form a parallelogram with said first arm and said third arm being parallel and said second arm and said fourth arm being parallel, a counterweight attached to one of said third and fourth arms, means for advancing said carriage along said tram rail, and control means for actuating said advancing means, said control means being operatively associated with said balancer assembly to actuate said advancing means upon movement of one of said arms beyond a predetermined position.

2. A balancer assembly adapted to be affixed to an overhead mount comprising a pivot bearing mounted for pivotal movement about a horizontal axis, a generally horizontal first arm mounted for rotation about its longitudinal axis in said bearing, a generally vertical second arm adapted to receive a load to be balanced by said assembly, said second arm being pivotally connected to said first arm, a generally horizontal third arm pivotally connected to said second arm, a generally vertical fourth arm pivotally connected to said second arm and to said first arm, the spacing between said pivotal connections being such as to form a parallelogram with said first arm and said third arm being parallel and said second arm and said fourth arm being parallel, and a counterweight attached to one of said third and fourth arms.

3. A balancer assembly comprising a hanger adapted to be affixed to an overhead mount, a yoke having a base member and a pair of spaced arms connected thereto, the ends of said arms being pivotally connected to said hanger, said base member including a pivot bearing having a bore, a generally horizontal first arm rotatably supported in the bore of said bearing and having one end extending between the arms of said yoke, a generally vertical second arm adapted to receive a load to be balanced by said assembly, said second arm being pivotally connected to the other end of said first arm, a third arm pivotally connected to said second arm and a fourth arm pivotally connected at one end to said first arm and at the other end to said third arm, said arms between said pivotal connections forming a parallelogram, and a counterweight connected to said third arm, said second arm being angularly movable about the longitudinal axis of said first arm, about an axis through the pivotal connection between said second arm and said first arm, and about an axis through the pivotal connections of the arms of said yoke.

4. A balancer assembly comprising a hanger adapted to be affixed to an overhead mount, a pivot bearing connected to said hanger for pivotal movement about a horizontal axis, a generally horizontal first arm rotatably supported at a point intermediate its ends in said pivot bearing, a generally vertical second arm pivotally connected to one end of said first arm, said second arm being adapted to receive a load to be balanced by said assembly, a generally horizontal third arm pivotally connected to said second arm, a generally vertical fourth arm pivotally connected to said third arm and to the other end of said first arm, said arms between said pivotal connections forming a parallelogram, and a counterweight connected to said fourth arm.

5. The apparatus of claim 4 wherein said counterweight comprises two portions, a first portion maintained at a fixed position spaced from the pivot axis of said pivot bearing and a second portion which is movable between a first position in which its center of gravity is collinear with the pivot axis of said pivot bearing, whereby it exerts no balancing moment on said assembly, and a second position in which its center of gravity is displaced from said axis, whereby said portion exerts a moment to balance that of a load.

References Cited in the file of this patent
UNITED STATES PATENTS

| | | |
|---|---|---|
| 1,860,241 | Galko | May 24, 1932 |
| 2,176,979 | Platz | Oct. 24, 1939 |
| 3,014,494 | Scott et al. | Dec. 26, 1961 |

UNITED STATES PATENT OFFICE
CERTIFICATE OF CORRECTION

Patent No. 3,134,340 May 26, 1964

Robert A. Olsen et al.

It is hereby certified that error appears in the above numbered patent requiring correction and that the said Letters Patent should read as corrected below.

Column 7, line 47, and column 8, line 6, for "second", each occurrence, read -- third --.

Signed and sealed this 29th day of September 1964.

(SEAL)
Attest:

ERNEST W. SWIDER
Attesting Officer

EDWARD J. BRENNER
Commissioner of Patents